(12) United States Patent
Capalbo

(10) Patent No.: US 10,512,028 B1
(45) Date of Patent: Dec. 17, 2019

(54) WIRELESS SHORT RANGE COMMUNICATION SYSTEM

(71) Applicant: Kenneth Capalbo, Wakefield, RI (US)

(72) Inventor: Kenneth Capalbo, Wakefield, RI (US)

( * ) Notice: Subject to any disclaimer, the term of this patent is extended or adjusted under 35 U.S.C. 154(b) by 0 days.

(21) Appl. No.: 16/285,356

(22) Filed: Feb. 26, 2019

(51) Int. Cl.
    H04W 48/16    (2009.01)
    H04W 4/80     (2018.01)
    H04W 48/08    (2009.01)
    H04B 11/00    (2006.01)
    H04W 16/12    (2009.01)
    H04W 72/04    (2009.01)

(52) U.S. Cl.
    CPC ............ *H04W 48/08* (2013.01); *H04B 11/00* (2013.01); *H04W 4/80* (2018.02); *H04W 16/12* (2013.01); *H04W 48/16* (2013.01); *H04W 72/0406* (2013.01)

(58) Field of Classification Search
    CPC ....... H04W 48/08; H04W 48/16; H04W 4/80; H04W 16/12; H04W 72/0406; H04B 11/00; H04B 1/207; H04B 2001/3872
    See application file for complete search history.

(56) References Cited

U.S. PATENT DOCUMENTS

| | | | |
|---|---|---|---|
| 7,035,588 B2 | 4/2006 | Sim | |
| 7,110,800 B2 | 9/2006 | Nagayasu | |
| 7,257,372 B2 | 8/2007 | Kaltenbach | |
| D562,808 S | 2/2008 | Gwee | |
| 8,605,638 B2 * | 12/2013 | Kim | H04L 51/04 370/312 |
| 9,866,962 B2 | 1/2018 | Boesen | |
| 9,949,014 B2 | 4/2018 | Cramer | |
| 2006/0067550 A1 | 3/2006 | Puder | |
| 2007/0098195 A1 | 5/2007 | Holmes | |
| 2008/0152160 A1 * | 6/2008 | Chew | H04H 20/61 381/71.6 |
| 2013/0211628 A1 * | 8/2013 | Thurow | G06F 17/00 701/2 |
| 2014/0307180 A1 * | 10/2014 | Mischel, Jr. | G06F 3/044 349/12 |
| 2017/0111122 A1 * | 4/2017 | Shimizu | H04W 8/005 |
| 2017/0131114 A1 * | 5/2017 | Li | G01C 21/32 |
| 2018/0302757 A1 * | 10/2018 | Kanbara | H04W 12/001 |
| 2019/0020636 A1 * | 1/2019 | Gehring | H04L 9/0833 |
| 2019/0045046 A1 * | 2/2019 | Ma | H04M 1/571 |
| 2019/0182373 A1 * | 6/2019 | Snagg | H04M 1/6066 |

* cited by examiner

Primary Examiner — Andrew Wendell

(57) ABSTRACT

The wireless short range communication system is a broadcast communication system. By short range is meant that the wireless short range communication system has a maximum communication range of less than 4000 meters and a practical communication range of less than 2000 meters. The wireless short range communication system is a radio frequency system. The wireless short range communication system comprises a master transmitter and a plurality of receivers. The master transmitter transmits a radio frequency message that is received by the plurality of receivers. Each of the plurality of receivers receives and demodulates the radio frequency message. Each of the plurality of receivers converts the demodulated radio frequency message into an audio file. Each of the plurality of receivers forms an audio source that converts the audio file into an electrical signal used to control an audio device, which audibly announces the radio frequency message.

17 Claims, 4 Drawing Sheets

WIRELESS SHORT RANGE COMMUNICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electric communication technique including broadcast communication, more specifically, an arrangement of circuits and components adapted for receiving radio frequencies. (H04H40/18)

SUMMARY OF INVENTION

The wireless short range communication system is a broadcast communication system. By short range is meant that the wireless short range communication system has a maximum communication range of less than 4000 meters and a practical communication range of less than 2000 meters. The wireless short range communication system is a radio frequency system. The wireless short range communication system comprises a master transmitter and a plurality of receivers. The master transmitter transmits a radio frequency message that is received by the plurality of receivers. Each of the plurality of receivers receives and demodulates the radio frequency message. Each of the plurality of receivers converts the demodulated radio frequency message into an audio file. Each of the plurality of receivers forms an audio source that converts the audio file into an electrical signal used to control an audio device which audibly announces the radio frequency message.

These together with additional objects, features and advantages of the wireless short range communication system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless short range communication system in detail, it is to be understood that the wireless short range communication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless short range communication system.

It is therefore important that the claims be regarded as including such equivalent construction insofar as they do not depart from the spirit and scope of the wireless short range communication system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
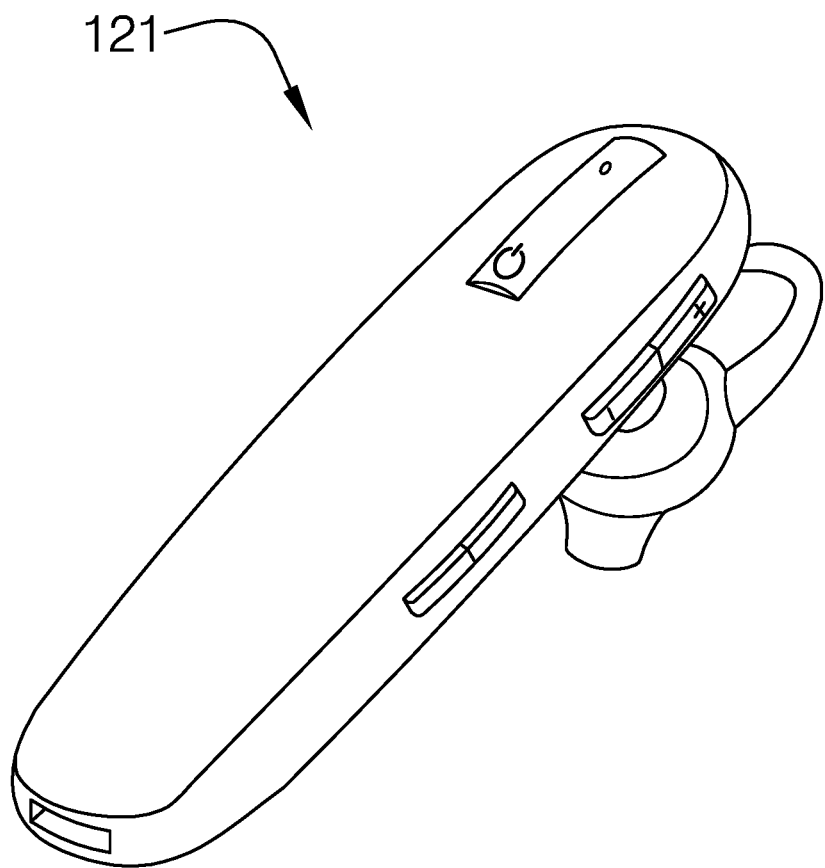
FIG. 1 is a perspective view of an embodiment of the disclosure.
Figure 2:
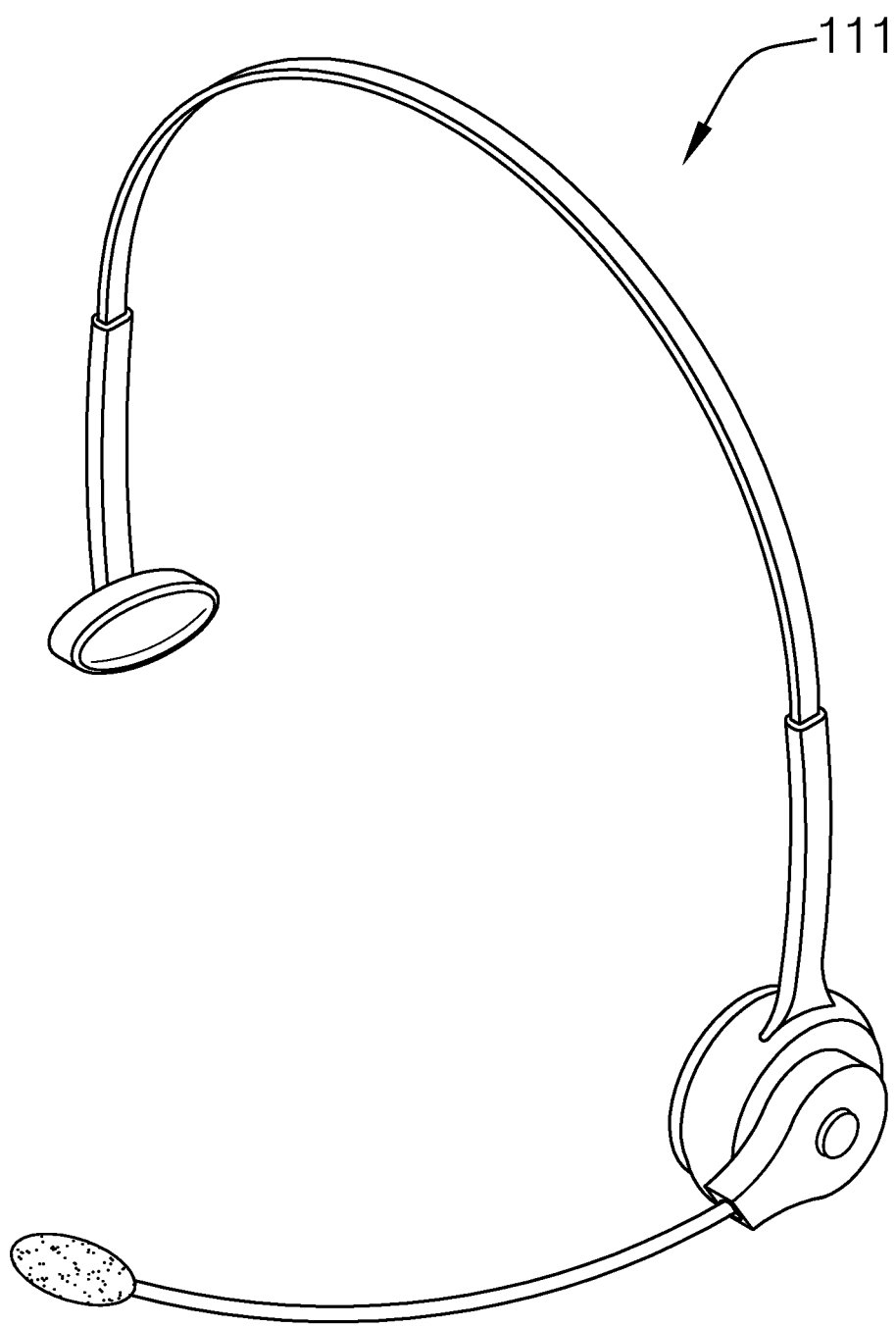
FIG. 2 is a perspective view of an embodiment of the disclosure.
Figure 3:
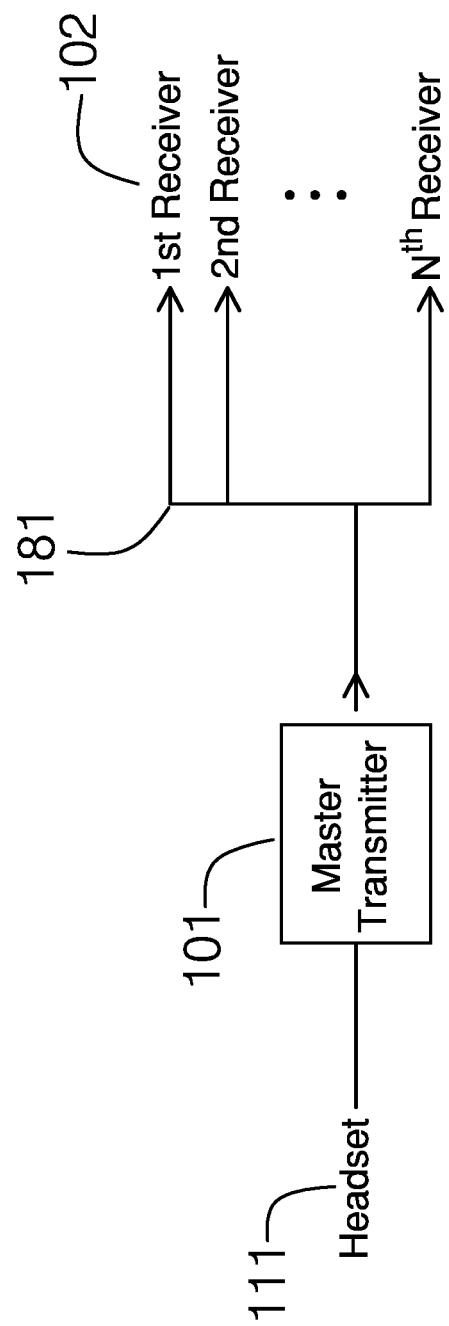
FIG. 3 is a block diagram of an embodiment of the disclosure.
Figure 4:
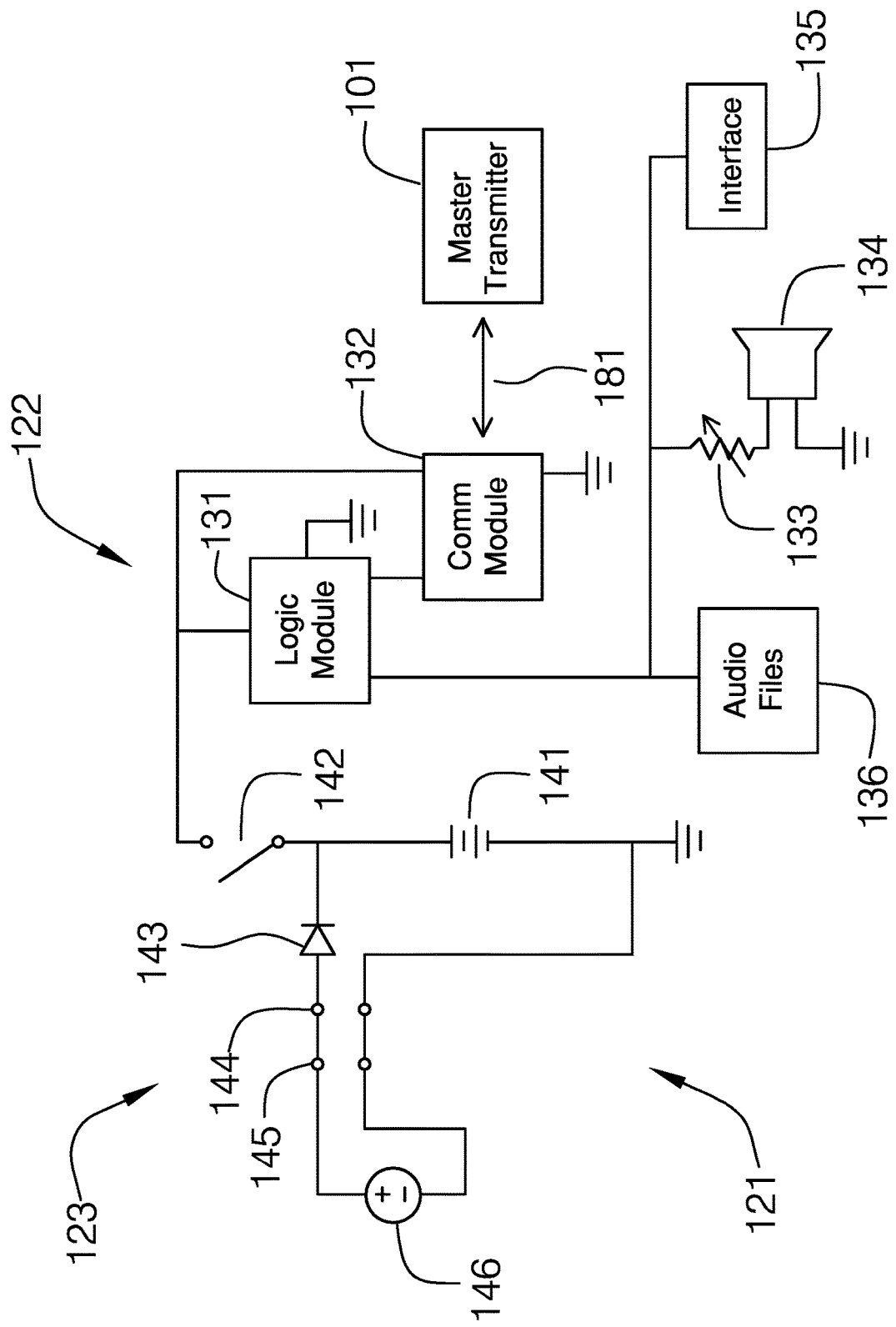
FIG. 4 is a block diagram of an embodiment of the disclosure.

Detailed reference will now be made to one or more potential embodiments of the disclosure, which are illustrated in FIGS. 1 through 4.

The wireless short range communication system 100 (hereinafter invention) is a broadcast communication system. By short range is meant that the invention 100 has a maximum communication range of less than 4000 meters and a practical communication range of less than 2000 meters. The invention 100 is a radio frequency system. The invention 100 comprises a master transmitter 101 and a plurality of receivers 102. The master transmitter 101 transmits a radio frequency message 181 that is received by the plurality of receivers 102. Each of the plurality of receivers 102 receives and demodulates the radio frequency message 181. Each of the plurality of receivers 102 converts the demodulated radio frequency message 181 into one or more audio files 136. Each of the plurality of receivers 102 forms an audio source that converts an audio file selected from the one or more audio files 136 into an electrical signal used to control an audio device which audibly announces the radio frequency message 181.

The master transmitter 101 is an electrical device. The master transmitter 101 is a radio frequency transmitter. The transmitter is defined elsewhere in this disclosure. The master transmitter 101 captures audible sounds. The master transmitter 101 converts the captured audible sounds into an electrical signal. The master transmitter 101 modulates the electrical signal from the audible sound into a radio frequency message 181. The master transmitter 101 transmits the radio frequency message 181. The master transmitter 101 is a well-known and documented electrical device. The master transmitter 101 further comprises a headset 111.

The headset 111 is a rigid structure. The headset 111 forms a housing that contains the electrical devices required to detect an audible message, modulate the audible message and transmit the audible message as a radio frequency message. The headset 111 is formed with all apertures and form factors necessary to allow the headset 111 to accommodate the use, the operation, and the external connections of the electrical devices required to detect an audible message, modulate the audible message and transmit the audible message as a radio frequency message. Methods to form a headset 111 suitable for the purposes described in this disclosure are well-known and documented in the mechanical arts. The headset 111 is defined in greater detail elsewhere in this disclosure.

Each of the plurality of receivers 102 is an electrical device. Each of the plurality of receivers 102 is a radio frequency receiver. The receiver is defined elsewhere in this disclosure. Each of the plurality of receivers 102 receives the radio frequency message 181 transmitted by the master transmitter 101. Each of the plurality of receivers 102 demodulates the received radio frequency message 181 into one or more audio files 136. Each of the plurality of receivers 102 is an audio source that that converts an audio file selected from the one or more audio files 136 into an electrical signal used to operate an audio device that audibly announces the contents of the radio frequency message 181. Each of the plurality of receivers 102 further comprises the audio device. The plurality of receivers 102 comprises a collection of individual receivers 112. The individual receiver 112 is a receiver that is worn by an individual. The individual receiver 112 is worn as an earbud 121. Each individual receiver 112 comprises an earbud 121, a receiving circuit 122, and a power circuit 123.

The earbud 121 is a rigid structure. The earbud 121 is a housing that contains the receiving circuit 122 and the power circuit 123. The earbud 121 is formed with all apertures and form factors necessary to allow the earbud 121 to accommodate the use, the operation, and the external connections of the receiving circuit 122 and the power circuit 123. Methods to form an earbud 121 suitable for the purposes described in this disclosure are well-known and documented in the mechanical arts.

The receiving circuit 122 is an electrical sub-circuit of the electrical device that forms the individual receiver 112. The receiving circuit 122 receives the radio frequency message 181 transmitted by the master transmitter 101. The receiving circuit 122 demodulates the received radio frequency message 181 into one or more audio files 136. The receiving circuit 122 is an audio source that that converts an audio file selected from the one or more audio files 136 into an electrical signal used to operate an audio device that audibly announces the contents of the radio frequency message 181. The receiving circuit 122 comprises a logic module 131, a communication module 132, a potentiometer 133, a speaker 134, an interface 135, and one or more audio files 136. The receiving circuit 122 stores the one or more audio files 136.

The logic module 131 is a readily and commercially available programmable electronic device that is used to manage, regulate, and operate the receiving circuit 122. Depending on the specific design and the selected components, the logic module 131 can be a separate component within the receiving circuit 122 or the functions of the logic module 131 can be incorporated into another component within the receiving circuit 122.

The logic module 131 demodulates the received radio frequency message 181 into one or more audio files 136. The logic module 131 is an audio source that that converts an audio file selected from the one or more audio files 136 into an electrical signal used to operate an audio device that audibly announces the contents of the radio frequency message 181.

The communication module 132 is a wireless electronic communication device that allows the logic module 131 to receive the radio frequency message 181 transmitted by the master transmitter 101. In the first potential embodiment of the disclosure, both the communication module 132 and the master transmitter 101 supports a communication protocol selected from the group consisting of an FRS protocol, a GRMS protocol, a WiFi protocol and a Bluetooth protocol.

The potentiometer 133 is an electrical circuit element. The potentiometer 133 performs in the manner of a resistor. The resistance presented by the potentiometer 133 is adjustable such that the resistance presented to the receiving circuit 122 can be adjusted while the receiving circuit 122 is in operation. The potentiometer 133 is electrically connected in series with the speaker 134.

The speaker 134 is a transducer that is used as the audio device of the receiving circuit 122. The speaker 134 is the audio device. The speaker 134 is operated by the logic module 131. The volume of the speaker 134 is modulated by the potentiometer 133. The speaker 134 is a function of the voltage presented across the speaker 134 by the electrical signal generated by the receiving circuit 122. The speaker 134 converts the presented electrical signal into an audible representation of the radio frequency message 181 received from the master transmitter 101.

The potentiometer 133 and the speaker 134 form a voltage divider such that the voltage presented across the speaker 134 by the logic module 131 varies in response to changes to the resistance presented by the potentiometer 133. The potentiometer 133 is used to vary the volume of the audible sounds generated by the speaker 134.

The interface 135 is a collection of interfaces operated by the users that allow for the control of the operation of the plurality of receivers 102. The design and implementation of interface 135 structures are well-known and documented in the electrical arts.

Each of the one or more audio files 136 is a digital representation of the audio information that is contained in the radio frequency message 181. By first storing the information contained in the radio frequency message 181, the one or more audio files 136 allows a user to replay a record of the audio content of the radio frequency message 181 at a later date. The one or more audio files 136 are stored in and maintained by the logic module 131.

The power circuit 123 is an electrical sub-circuit of the electrical device that forms the individual receiver 112. The power circuit 123 is an electrochemical device that converts chemical potential energy into electrical energy. The electrical energy generated by the power circuit 123 powers the operation of the receiving circuit 122. The power circuit 123 comprises a battery 141, a master switch 142, a diode 143, a charging port 144, an external power source 145, and charging plug 146.

The master switch 142 is a maintained switch. The master switch 142 forms a series electrical connection between the battery 141 and the receiving circuit 122. The master switch 142 controls the flow of electrical energy into the receiving circuit 122.

The battery 141 is a commercially available rechargeable battery 141. The chemical energy stored within the rechargeable battery 141 is renewed and restored through the use of the charging port 144. The charging port 144 is an electrical circuit that reverses the polarity of the rechargeable battery 141 and provides the energy necessary to reverse the chemical processes that the rechargeable battery 141 initially used to generate the electrical energy. This reversal of the chemical process creates a chemical potential energy that will later be used by the rechargeable battery 141 to generate electricity.

The charging port 144 forms an electrical connection to an external power source 145 using a charging plug 146. The charging plug 146 forms a detachable electrical connection with the charging port 144. The charging port 144 receives electrical energy from the external power source 145 through the charging plug 146. The diode 143 is an electrical device that allows current to flow in only one direction. The diode 143 installs between the rechargeable battery 141 and the charging port 144 such that electricity will not flow from the first positive terminal 161 of the rechargeable battery 141 into the second positive terminal 162 of the external power source 145. In the first potential embodiment of the disclosure, the external power source 145 and the charging port 144 are compatible with USB power requirements.

The following definitions were used in this disclosure:

Audio Device: As used in this disclosure, an audio device is a device that generates audible sound waves.

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted into audible sounds by a speaker.

Battery: As used in this disclosure, a battery is a chemical device consisting of one or more cells, in which chemical energy is converted into electricity and used as a source of power. Batteries are commonly defined with a positive terminal and a negative terminal.

Bluetooth™: As used in this disclosure, Bluetooth™ is a standardized communication protocol that is used to wirelessly interconnect electronic devices.

Broadcast: As used in this disclosure, a broadcast refers to a radio frequency transmission intended to be received by a plurality of receivers.

Earphone: As used in this disclosure, an earphone refers to a device that converts electrical signals into audible sounds that are worn or listened to in contact with the ear.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

FRS and GMRS: As used in this disclosure, FRS is an acronym for family radio service and general mobile radio service. The FRS and the GMRS are frequency modulated mobile radios communication systems that operate in the 462 MHz to 467 MHz frequency range. The FRS is an unlicensed system intended for non-commercial use. The use of the GMRS system is reserved for licensed operators.

Headphone: As used in this disclosure, a headphone is a device that comprises one or two earphones that are held to the ear, typically through the use of a band placed on top of the head. The headphone comprises one or more speakers and an optional microphone to allow for: 1) private access to an audio communication system; and, 2) hands free access to an audio communication system. Headset is a synonym for headphone.

Housing: As used in this disclosure, a housing is a rigid casing that encloses and protects one or more devices.

Interface: As used in this disclosure, an interface is a physical or virtual boundary that separates two different systems across which information is exchanged.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

Maintained Switch: A used in this disclosure, a maintained switch is a switch that maintains the position that was set in the most recent switch actuation. A maintained switch works in an opposite manner to a momentary switch.

Potentiometer: As used in this disclosure, a potentiometer is an adjustable electrical device that presents a resistance to a voltage. The level of resistance is adjustable.

Radio Frequency: As used in this disclosure, a radio frequency refers to electromagnetic radiation that is propagated in a spectrum ranging from 10 KHz to 1 THz.

Receiver: As used in this disclosure, a receiver is a device that is used to receive and demodulate electromagnetic radiation such as radio signals.

Recording Appliance: As used in this disclosure, a recording appliance is a device that captures a permanent record of an event selected from the group consisting of an audible event, a visual event, or a combination of an audible and visual event as the selected event occurs. The permanent record is used to present subsequent reproductions of the selected event. Recording appliances are commonly used to present these subsequent reproductions. Recording appliances are well-known, well documented and commercially available. Recording devices are often electrical devices.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force.

Speaker: As used in this disclosure, a speaker is an electrical transducer that converts an electrical signal into an audible sound.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Transducer: As used in this disclosure, a transducer is a device that converts a physical quantity, such as pressure or brightness into an electrical signal or a device that converts an electrical signal into a physical quantity.

Transmitter: As used in this disclosure, a transmitter is a device that is used to generate and transmit electromagnetic radiation such as radio signals.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A broadcast communication system comprising:
   a master transmitter and a plurality of receivers;
   wherein the master transmitter transmits a radio frequency message to the plurality of receivers;
   wherein the broadcast communication system is a short range system;
   wherein by short range is meant that the broadcast communication system has a maximum communication range of less than 4000 meters and a practical communication range of less than 2000 meters;
   wherein the broadcast communication system is a radio frequency system;
   wherein each of the plurality of receivers receives and demodulates the radio frequency message;
   wherein each of the plurality of receivers converts the demodulated radio frequency message into one or more audio files;
   wherein each of the plurality of receivers forms an audio source that converts an audio file selected from the one or more audio files into an electrical signal used to control an audio device which audibly announces the radio frequency message;
   wherein the master transmitter is a radio frequency transmitter;
   wherein the master transmitter captures audible sounds;
   wherein the master transmitter converts the captured audible sounds into an electrical signal;
   wherein the master transmitter modulates the electrical signal from the audible sound into the radio frequency message;
   wherein the master transmitter further comprises a headset;
   wherein the headset is a rigid structure;
   wherein the headset forms a housing that contains the electrical devices required to detect the audible message, modulate the audible message and transmit the audible message as a radio frequency message.

2. The broadcast communication system according to claim 1
   wherein each of the plurality of receivers is a radio frequency receiver;
   wherein each of the plurality of receivers receives the radio frequency message transmitted by the master transmitter;
   wherein each of the plurality of receivers demodulates the received radio frequency message into one or more audio files;
   wherein each of the plurality of receivers is an audio source that that converts an audio file selected from the one or more audio files into an electrical signal used to operate an audio device that audibly announces the contents of the radio frequency message.

3. The broadcast communication system according to claim 2
   wherein the plurality of receivers comprises a collection of individual receivers;
   wherein each individual receiver comprises an earbud, a receiving circuit, and a power circuit;
   wherein the receiving circuit and the power circuit are electrically interconnected;
   wherein the earbud is a housing that contains the receiving circuit and the power circuit;
   wherein the earbud is a rigid structure.

4. The broadcast communication system according to claim 3
   wherein the receiving circuit is an electrical sub-circuit of the electrical device that forms the individual receiver;
   wherein the receiving circuit receives the radio frequency message transmitted by the master transmitter;
   wherein the receiving circuit demodulates the received radio frequency message into one or more audio files;
   wherein the receiving circuit is an audio source that that converts an audio file selected from the one or more audio files into an electrical signal used to operate an audio device that audibly announces the contents of the radio frequency message.

5. The broadcast communication system according to claim 4
   wherein the power circuit is an electrical sub-circuit of the electrical device that forms the individual receiver;
   wherein the power circuit is an electrochemical device that converts chemical potential energy into electrical energy;
   wherein the electrical energy generated by the power circuit powers the operation of the receiving circuit.

6. The broadcast communication system according to claim 5
   wherein the receiving circuit comprises a logic module, a communication module, a potentiometer, a speaker, and the one or more audio files;

wherein the logic module, the communication module, the potentiometer, and the speaker are electrically interconnected;

wherein the receiving circuit stores the one or more audio files.

7. The broadcast communication system according to claim 6
wherein the logic module is a programmable electronic device;
wherein the communication module is a wireless electronic communication device;
wherein the logic module receives the radio frequency message transmitted by the master transmitter.

8. The broadcast communication system according to claim 7
wherein each of the logic module demodulates the received radio frequency message into one or more audio files;
wherein each of the logic module is an audio source that that converts an audio file selected from the one or more audio files into an electrical signal used to operate an audio device that audibly announces the contents of the radio frequency message.

9. The broadcast communication system according to claim 8
wherein the potentiometer is an electrical circuit element;
wherein the potentiometer performs in the manner of a resistor;
wherein the resistance presented by the potentiometer is adjustable such that the resistance presented to the receiving circuit can be adjusted while the receiving circuit is in operation.

10. The broadcast communication system according to claim 9 wherein
the potentiometer is electrically connected in series with the speaker.

11. The broadcast communication system according to claim 10
wherein the speaker is a transducer;
wherein the speaker is the audio device;
wherein the speaker is operated by the logic module;
wherein the volume of the speaker is modulated by the potentiometer.

12. The broadcast communication system according to claim 11 wherein the speaker converts the electrical signal presented by the logic module into an audible representation of the radio frequency message received from the master transmitter.

13. The broadcast communication system according to claim 12
wherein each of the one or more audio files is a digital representation of the audio information that is contained in the radio frequency message;
wherein the one or more audio files are stored in and maintained by the logic module.

14. The broadcast communication system according to claim 13
wherein the power circuit comprises a battery, a master switch, a diode, a charging port, an external power source, and charging plug;
wherein the battery, the master switch, the diode, the charging port, the external power source, and the charging plug are electrically interconnected.

15. The broadcast communication system according to claim 14
wherein the master switch is a maintained switch;
wherein the master switch forms a series electrical connection between the battery and the receiving circuit;
wherein the master switch controls the flow of electrical energy into the receiving circuit.

16. The broadcast communication system according to claim 15
wherein the battery is a rechargeable battery;
wherein the charging port is an electrical circuit that reverses the polarity of the rechargeable battery;
wherein the charging port forms an electrical connection to an external power source using the charging plug;
wherein the charging plug forms a detachable electrical connection with the charging port;
wherein the charging port receives electrical energy from the external power source through the charging plug;
wherein the diode is an electrical device that allows current to flow in only one direction.

17. The broadcast communication system according to claim 16 wherein the diode installs between the rechargeable battery and the charging port such that electricity will not flow from the rechargeable battery into the external power source.

* * * * *